(12) United States Patent
He

(10) Patent No.: US 11,054,682 B2
(45) Date of Patent: Jul. 6, 2021

(54) LIQUID CRYSTAL DISPLAY DEVICE AND DRIVING METHOD THEREOF

(71) Applicant: HKC CORPORATION LIMITED, Guangdong (CN)

(72) Inventor: Huailiang He, Chongqing (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 16/641,394

(22) PCT Filed: Dec. 12, 2017

(86) PCT No.: PCT/CN2017/115701
§ 371 (c)(1),
(2) Date: Feb. 24, 2020

(87) PCT Pub. No.: WO2019/037339
PCT Pub. Date: Feb. 28, 2019

(65) Prior Publication Data
US 2020/0201097 A1  Jun. 25, 2020

(30) Foreign Application Priority Data
Aug. 25, 2017 (CN) .......................... 201710741436.X

(51) Int. Cl.
*G02F 1/1337* (2006.01)
*G02F 1/133* (2006.01)
*G09G 3/36* (2006.01)

(52) U.S. Cl.
CPC ........ *G02F 1/13306* (2013.01); *G02F 1/1337* (2013.01); *G09G 3/3696* (2013.01)

(58) Field of Classification Search
CPC .. G09G 3/3614; G09G 3/3648; G09G 3/3685; G09G 3/3696; G09G 3/3688;
(Continued)

(56) References Cited

U.S. PATENT DOCUMENTS 6,933,916 B2   8/2005  Nakao et al.
2001/0040546 A1*  11/2001  Ohmuro ............... G09G 3/3648
345/87
(Continued)

FOREIGN PATENT DOCUMENTS

CN         1641726 A      7/2005
CN         101021655 A    8/2007
(Continued)

*Primary Examiner* — Nitin Patel
*Assistant Examiner* — Amen W. Bogale
(74) *Attorney, Agent, or Firm* — Muncy, Geissler, Olds and Lowe, P.C.

(57) ABSTRACT

A liquid crystal display device and a driving method thereof are provided. The driving circuit of the liquid crystal display device outputs a drive voltage applied between the first electrode and the second electrode of a sub-pixel of a display panel. When a transmittance of the sub-pixel is changed from a transmittance value to another transmittance value higher than the transmittance value in a first frame period, the drive voltage applied between the first electrode and the second electrode is lower than or equal to a target drive voltage corresponding to the another transmittance value in a front half period of the first frame period, the drive voltage is higher than the target drive voltage in a rear half period of the first frame period, and the drive voltage is equal to the target drive voltage in other frame periods after the first frame period.

20 Claims, 8 Drawing Sheets

(58) Field of Classification Search
CPC ...... G09G 3/3607; G09G 3/36; G09G 3/2007; G09G 3/2011; G09G 2300/0491; G09G 2310/0251; G09G 2310/06; G09G 2310/027; G09G 2320/0252; G09G 2320/0233; G09G 2320/0247; G09G 2320/0242; G09G 2320/0276; G09G 2320/0261; G09G 2340/16; G02F 1/13306; G02F 1/1337; G02F 1/133707; G02F 1/1393; G02F 1/134336; G02F 1/13; G02F 1/139; G02F 3/2018; G02F 3/2022; G02F 3/2077; G02F 3/2081; G02F 3/3648; G02F 3/3614; G02F 3/3696; G02F 3/36; G02F 3/3685; G02F 3/3607; G02F 3/2011; G02F 3/2007; G02F 3/3688; G02F 3/3677; G02F 2320/0247; G02F 2320/0233; G02F 2320/0252; G02F 2320/0257; G02F 2320/0266; G02F 2320/0271; G02F 2320/0276; G02F 2320/028; G02F 2320/0626; G02F 2320/0633; G02F 2320/064; G02F 2320/0653; G02F 2320/0673; G02F 2320/068; G02F 2320/041; G02F 2320/0261; G02F 2320/066; G02F 2320/0242; G02F 2300/0478; G02F 2310/06; G02F 2310/027; G02F 2330/028; G02F 2340/16; G02F 2340/0435; G02F 2360/18
See application file for complete search history.

(56) References Cited

U.S. PATENT DOCUMENTS

| | | | | |
|---|---|---|---|---|
| 2006/0279497 | A1* | 12/2006 | Sasaki | G02F 1/133707 345/87 |
| 2008/0094334 | A1* | 4/2008 | Baek | G09G 3/3688 345/89 |
| 2008/0165108 | A1* | 7/2008 | Shen | G09G 3/3614 345/94 |
| 2010/0207859 | A1* | 8/2010 | Tanaka | G09G 3/3648 345/89 |
| 2018/0005591 | A1* | 1/2018 | Yoshiga | G09G 3/3614 |

FOREIGN PATENT DOCUMENTS

| | | |
|---|---|---|
| CN | 102289108 A | 12/2011 |
| CN | 103185987 A | 7/2013 |
| CN | 105913825 A | 8/2016 |
| CN | 107450210 A | 12/2017 |
| KR | 20030055385 A | 7/2003 |
| TW | 567455 B | 12/2003 |

* cited by examiner

LIQUID CRYSTAL DISPLAY DEVICE AND DRIVING METHOD THEREOF

BACKGROUND

Technical Field

This disclosure relates to a display device and a driving method thereof, and more particularly to a liquid crystal display device having negative dielectric anisotropy, and a driving method thereof.

Related Art

With the advancement of technology, flat panel displays have been widely applied to various fields. More particularly, a liquid crystal display apparatus having the predominant properties, such as the thin and light properties, the low power consumption and the radiationless property, has gradually replaced the conventional cathode ray tube display apparatus, and has been applied to various electronic products, such as a mobile phone, a portable multimedia apparatus, a notebook computer, a liquid crystal television, a liquid crystal display and the like.

A TN type liquid crystal display panel is known to have a problem of a narrow viewing angle. In order to improve this problem, a liquid crystal display panel using the multi-domain vertical alignment (MVA) technology has been proposed. The MVA type liquid crystal display panel uses the protrusion disposed on the pixel electrode or the common electrode to make the liquid crystal molecules tilt at multiple angles when no externally applied voltage is present. When the drive voltage is applied, the liquid crystal molecules can be rotated in the direction of the original tilt. In addition to that the reaction speed of the liquid crystal is increased, the liquid crystal molecules of the pixel can achieve multi-domain vertical alignment and achieve the objective of providing the wide viewing angle.

The n-type liquid crystal vertical alignment of the MVA type liquid crystal panel is in a state in which no driving voltage is applied, most of the liquid crystal molecules are vertically arranged on the upper and lower substrates to become a state where the transmittance is zero (that is, a black display). When a driving voltage smaller than a predetermined voltage (or a given voltage) is applied, the tilt directions of the liquid crystal molecules are determined under the influence of the inclined surface of the protrusion. Thus, in a state where the drive voltage is smaller than the predetermined voltage, the optical properties of the liquid crystal molecules can be homogenized to obtain the uniform halftone. In addition, when the drive voltage of the predetermined voltage is applied, the liquid crystal molecules can be roughly horizontally arranged to make the display panel obtain the white display.

In the MVA type liquid crystal display panel, however, when the black display corresponding to the drive voltage being the low voltage (e.g., about 1 volt) is converted into the low brightness halftone display (the transmittance is, for example, below 10%) corresponding to the higher drive voltage (e.g., about 2 to 3 volts), the response speed of the liquid crystal molecules is slower than that of the TN type liquid crystal display panel. The reason is that no grinding treatment is performed on the alignment film in the MVA type liquid crystal display panel, and directions of the long axes of the liquid crystal molecules in some small areas are in multiple directions in a state where no externally applied voltage is present. Thus, when the drive voltage is the low potential of about 2 to 3 V, it is quite time-consuming for most of the liquid crystal molecules to reach a predetermined direction.

In addition, when the black display corresponding to the drive voltage being the low voltage is converted into the high brightness halftone display (the transmittance is, for example, 10% to 15%) corresponding to the higher voltage (e.g., about 3 to 4 V), or when the black display corresponding to the drive voltage being the low voltage (e.g. about 1 V) is converted into the high drive voltage (e.g., about 5 V) of the white display (the transmittance is, for example, 15% or more), the response speed of the liquid crystal molecules is not high enough. In addition, due to the brightness over-shoot phenomenon, there may be a problem with the poor display frame (such as blinking). The reason of the brightness over-shoot is that the drive voltage of 3 V or more makes the rotation torque of the liquid crystal molecules become large, causes the predetermined direction of the liquid crystal to exceed the target direction, and results in the brightness over-shoot.

SUMMARY

This disclosure is to provide a liquid crystal display device and a driving method thereof, which can decrease the response speed of the liquid crystal when the black display is converted into the white display.

The disclosure provides a liquid crystal display device, comprising a display panel, at least one protrusion and a drive circuit. The display panel includes a plurality of sub-pixels and a first substrate, a second substrate and a liquid crystal layer interposed between the first substrate and the second substrate. The first substrate comprises a first electrode, and the second substrate comprises a second electrode. The protrusion is disposed on the first electrode or the second electrode. The drive circuit is electrically connected to the display panel and outputs a drive voltage applied between the first electrode and the second electrode corresponding to one of the sub-pixels. When a transmittance of the sub-pixel is changed from a transmittance value to another transmittance value higher than the transmittance value in a first frame period, the drive voltage applied between the first electrode and the second electrode corresponding to the sub-pixel is lower than or equal to a target drive voltage corresponding to the another transmittance value in a front half period of the first frame period, the drive voltage applied between the first electrode and the second electrode corresponding to the sub-pixel is higher than the target drive voltage in a rear half period of the first frame period, and the drive voltage applied between the first electrode and the second electrode corresponding to the sub-pixel is equal to the target drive voltage in other frame periods after the first frame period.

The disclosure also provides a driving method of a liquid crystal display device. The liquid crystal display device comprises a display panel, at least one protrusion and a drive circuit. The display panel includes a plurality of sub-pixels and a first substrate, a second substrate and a liquid crystal layer interposed between the first substrate and the second substrate. The first substrate comprises a first electrode, and the second substrate comprises a second electrode. The protrusion is disposed on the first electrode or the second electrode. The drive circuit is electrically connected to the display panel and outputs a drive voltage applied between the first electrode and the second electrode corresponding to one of the sub-pixels. The driving method comprises: when a transmittance of the sub-pixel is changed from a transmittance value to another transmittance value higher than the transmittance value in a first frame period, applying the drive voltage between the first electrode and the second electrode corresponding to the sub-pixel, wherein the drive voltage is lower than or equal to a target drive voltage corresponding to the another transmittance value in a front half period of the first frame period, the drive voltage is higher than the target drive voltage in a rear half period of the first frame period, and the drive voltage is equal to the target drive voltage in other frame periods after the first frame period.

In one embodiment, the drive circuit comprises a temperature compensation unit, and the temperature compensation unit decreases a voltage value of the drive voltage in the first frame period when a temperature of the display panel rises.

In one embodiment, the display panel further comprises a first polarizer and a second polarizer, the first polarizer is disposed on a surface of the first substrate away from the liquid crystal layer, and the second polarizer is disposed on a surface of the second substrate away from the liquid crystal layer.

In one embodiment, the first substrate further comprises a first alignment film and a second alignment film, the first alignment film is disposed on the first electrode and the protrusion, and the second alignment film is disposed on the second electrode and the protrusion.

In one embodiment, the protrusion functions as a local restriction mechanism to restrict arrangement directions of a plurality of liquid crystal molecules corresponding to the sub-pixel to make long axes of the liquid crystal molecules become substantial vertical when no externally applied voltage is present, make the long axes of the liquid crystal molecules become substantial parallel when a predetermined voltage is externally applied, and make directions of the long axes of most of the liquid crystal molecules become tilted when a voltage lower than the predetermined voltage is externally applied.

The disclosure further provides a driving method of a liquid crystal display device. The liquid crystal display device comprises a display panel, at least one protrusion and a drive circuit. The display panel includes a plurality of sub-pixels and a first substrate, a second substrate and a liquid crystal layer interposed between the first substrate and the second substrate. The first substrate comprises a first electrode, and the second substrate comprises a second electrode. The protrusion is disposed on the first electrode or the second electrode, and functions as a local restriction mechanism to restrict arrangement directions of a plurality of liquid crystal molecules corresponding to the sub-pixel to make long axes of the liquid crystal molecules become substantial vertical when no externally applied voltage is present, make the long axes of the liquid crystal molecules become substantial parallel when a predetermined voltage is externally applied, and make directions of the long axes of most of the liquid crystal molecules become tilted when a voltage lower than the predetermined voltage is externally applied. The drive circuit is electrically connected to the display panel and outputs a drive voltage applied between the first electrode and the second electrode corresponding to one of the sub-pixels. The driving method comprises: when a transmittance of the sub-pixel is changed from a transmittance value to another transmittance value higher than the transmittance value in a first frame period, applying the drive voltage between the first electrode and the second electrode corresponding to the sub-pixel, wherein the drive voltage is lower than or equal to a target drive voltage corresponding to the another transmittance value in a front half period of the first frame period, the drive voltage is higher than the target drive voltage in a rear half period of the first frame period, and the drive voltage is equal to the target drive voltage in other frame periods after the first frame period. The drive circuit comprises a temperature compensation unit, and the temperature compensation unit decreases a voltage value of the drive voltage in the first frame period when a temperature of the display panel rises.

As mentioned above, in the liquid crystal display device and the driving method thereof of this disclosure, when a transmittance of the sub-pixel is changed from one transmittance value to another transmittance value higher than the first transmittance value in a first frame period, the drive voltage applied between the first electrode and the second electrode corresponding to the sub-pixel is lower than or equal to the target drive voltage corresponding to the another transmittance value in a front half period of the first frame period, the drive voltage applied between the first electrode and the second electrode corresponding to the sub-pixel is higher than the target drive voltage in the rear half period of the first frame period, and the drive voltage applied between the first electrode and the second electrode corresponding to the sub-pixel is equal to the target drive voltage in other frame periods after the first frame period. With the above-mentioned driving method, the n-type MVA liquid crystal display device of this disclosure can shorten the response time of the liquid crystal, during which the black display is converted into the white display, the time of the brightness over-shoot phenomenon is very short, and no adverse impact on the display frame is present.

BRIEF DESCRIPTION OF THE DRAWINGS

The embodiments will become more fully understood from the detailed description and accompanying drawings, which are given for illustration only, and thus are not limitative of the present invention, and wherein.

DETAILED DESCRIPTION OF THE INVENTION

Figure 1:
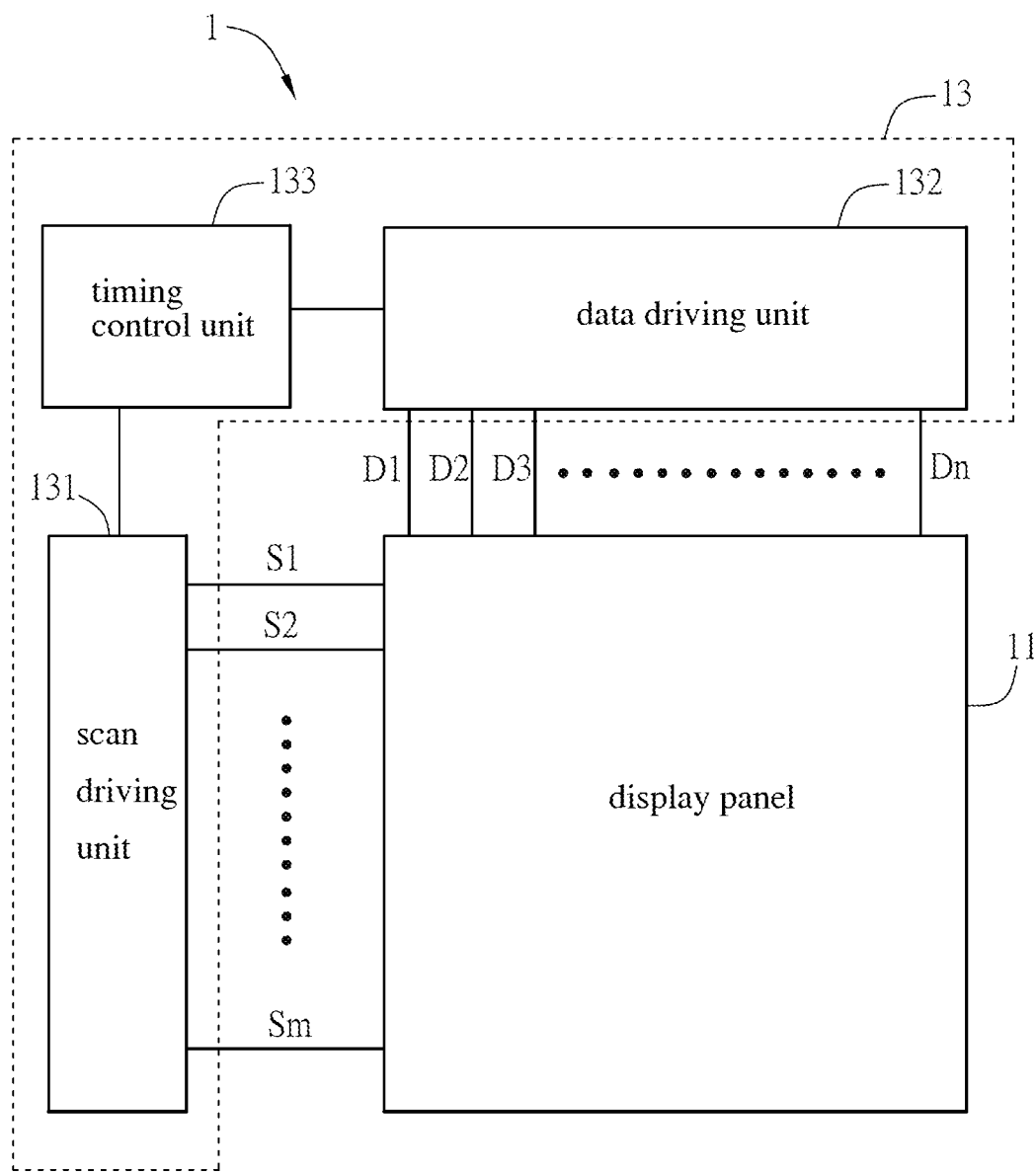
FIG. 1 is a functional schematic block diagram showing an embodiment of a liquid crystal display device of this disclosure.

Specific structures and function details disclosed herein are only for the illustrative purpose for describing the exemplary embodiment of this disclosure. However, this disclosure can be specifically implemented through many replacements, and should not be explained as being restricted to only the embodiment disclosed herein.

In the description of this disclosure, it is to be understood that the terms "center", "transversal", "up," "down," "left," "right," "vertical", "horizontal", "top," "bottom," "inside" and "outside" indicating the orientation or position relationships are the orientation or position relationships based on the drawing, are only provided for the purposes of describing this disclosure and simplifying the description, but do not indicate or imply that the directed devices or elements must have the specific orientations or be constructed and operated in the specific orientations, and thus cannot be understood as the restriction to this disclosure. In addition, the terms "first," and "second" are used for the illustrative purpose only and cannot be understood as indicating or implying the relative importance or implicitly specifying the number of indicated technical features. Therefore, the features restricted by "first" and "second" may expressly or implicitly comprise one or multiple ones of the features. In the description of this disclosure, unless otherwise described, the meaning of "multiple" comprises two or more than two. In addition, the terms "comprises" and any modification thereof intend to cover the non-exclusive inclusions.

In the description of this disclosure, it needs to be described that, unless otherwise expressly stated and limited, the terms "mount," "link" and "connect" should be broadly understood. For example, they may be the fixed connection, may be the detachable connection or may be the integral connection; may be the mechanical connection or may also be the electrical connection; or may be the direct connection, may be the indirect connection through a middle medium or may be the inner communication between two elements. It will be apparent to those skilled in the art that the specific meanings of the above terms in this application may be understood according to the specific conditions.

The terms used herein are for the purpose of describing only specific embodiments and are not intended to limit the exemplary embodiments. Unless the contexts clearly indicate otherwise, the singular form "one," "a" and "an" used here further intend to include plural forms. It should also be understood that the terms "comprising" and/or "including" are used herein to describe the features to describe the presence of stated features, integers, steps, operations, units and/or elements without excluding the presence or addition of one or more other features, integers, steps, operations, units, elements, and/or combinations thereof.

This disclosure is further described below with reference to the accompanying drawings and examples.

FIG. 1 is a functional schematic block diagram showing an embodiment of a liquid crystal display device 1 of this disclosure. The liquid crystal display device 1 is a liquid crystal display device having negative dielectric anisotropy (n-type MVA liquid crystal display device), or other VA type liquid crystal display devices. In this embodiment, the n-type MVA liquid crystal display device is taken as an example.

The liquid crystal display device 1 includes a display panel 11, at least one protrusion 12 (shown in FIG. 2B) and a drive circuit 13. In addition, the liquid crystal display device 1 may further include a plurality of scan lines S1 to Sm and a plurality of data lines D1 to Dn.

The display panel 11 includes at least one sub-pixel. The display panel 11 of this embodiment is a MVA type liquid crystal display panel, and includes a plurality of sub-pixels. The data lines D1 to Dn and the scan lines S1 to Sm are interleaved to define the sub-pixels.

The drive circuit 13 is electrically connected to the display panel 11. The drive circuit 13 of this embodiment may include a scan driving unit 131, a data driving unit 132 and a timing control unit 133. The scan driving unit 131 may be coupled to the display panel 11 through the scan lines S1 to Sm, and the data driving unit 132 may be coupled to the display panel 11 through the data lines D1 to Dn. The data driving unit 132 may output a plurality of data signals corresponding to the sub-pixels corresponding to drive the corresponding data lines D1 to Dn. In addition, the liquid crystal display device 1 may further include the timing control unit 133, the timing control unit 133 may transfer a vertical sync signal and a horizontal sync signal to the scan driving unit 131, convert a video signal received from an external interface into a data signal for use by the data driving unit 132, and transfer the data signal and the horizontal sync signal to the data driving unit 132. In addition, the scan driving unit 131 can sequentially turn on the scan lines S1 to Sm according to the vertical sync signal. In one frame time, when the scan lines S1 to Sm are respectively and sequentially turned on, the data driving unit 132 transfers the voltage signal to a pixel electrode of each sub-pixel through the data lines D1 to Dn in correspondence with the data signal of each row of sub-pixels, so that the liquid crystal display device 1 can display an image.

Figure 2A:
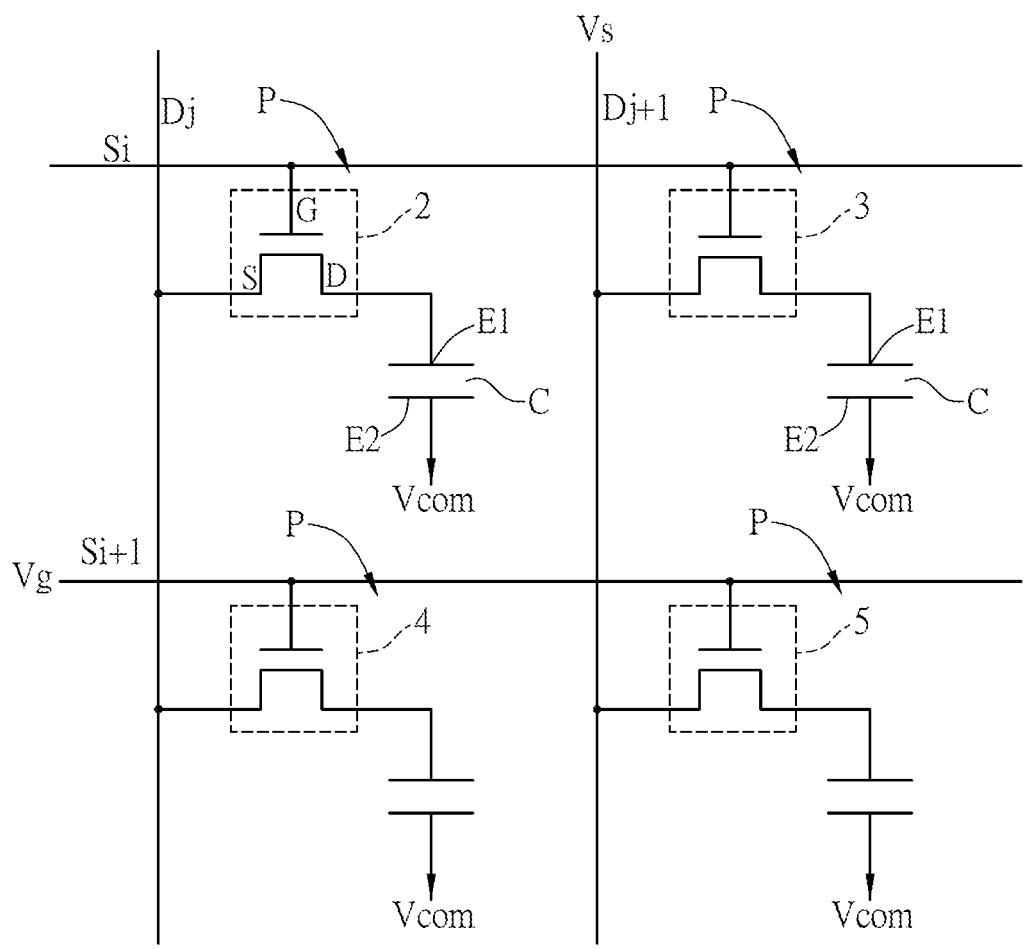
FIG. 2A is a schematic view showing an equivalent circuit of an embodiment of a display panel of this disclosure.
Figure 2B:
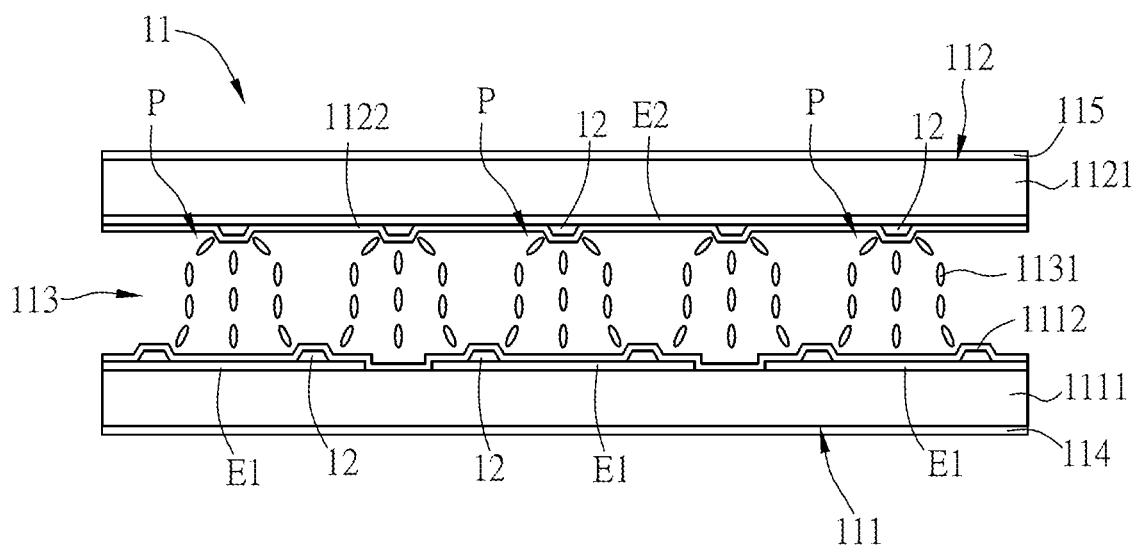
FIG. 2B is a schematically cross-sectional view of an embodiment of the display panel of this disclosure.

FIG. 2A is a schematic view showing an equivalent circuit of an embodiment of a display panel 11 of this disclosure, and FIG. 2B is a schematically cross-sectional view of an embodiment of the display panel 11 of this disclosure.

In the actual MVA type liquid crystal display panel, for example, 1024×3×768 sub-pixels P arranged in a two-dimensional matrix may be formed when the color display is performed. In FIG. 2A, 3×3 sub-pixels P are taken as an example for illustration.

In FIG. 2A, the transversal scan lines Si, Si+1 and the longitudinal data lines Dj, Dj+1 are interleaved to define four sub-pixels P with the same structure, and each of the sub-pixels P includes a switch element (2 to 5), a first electrode E1 and a second electrode E2. The switch elements 2 to 5 may be thin film transistors (TFTs), the first electrode E1 is the pixel electrode, and the second electrode E2 is the common electrode. The first electrode E1 and the second electrode E2 may constitute a liquid crystal capacitor C. In addition, the drive circuit 13 may output the drive voltage applied between the first electrode E1 and the second electrode E2 corresponding to each sub-pixel P to drive the liquid crystal molecules between the two electrodes to rotate.

Taking the sub-pixel P at the upper left corner as an example, the switch element 2 has a gate G connected to the scan line Si, a source S connected to the data line Dj and a drain D connected to the first electrode E1, and the second electrode E2 is connected to a common voltage (Vcom). In some embodiments, the voltage value of the common voltage may be 0 volts (grounded), and the materials of the first electrode E1 and the second electrode E2 may be, for example but without limitation to, transparent electroconductive materials, such as indium-tin oxide (ITO) or indium-zinc oxide (IZO) and the like. When the gate G of the switch element 2 is applied with a scan signal (voltage Vg) to turn on, the data voltage (voltage Vs) outputted by the data driving unit 132 can be applied to the first electrode E1, so that a voltage difference is generated between the first electrode E1 and the second electrode E2 to control the rotation of the liquid crystal molecules between the two electrodes. In an embodiment, each pixel P may further include a storage electrode (not shown), and the storage electrode and the second electrode E2 form an auxiliary capacitor.

In addition, in FIG. 2B, the display panel 11 may include a first substrate 111, a second substrate 112 and a liquid crystal layer 113 interposed between the first substrate 111 and the second substrate 112. The first substrate 111 may be a thin film transistor substrate, and may include a first light-permeable substrate 1111, a first electrode E1 and a first alignment film 1112. The second substrate 112 may be a color filter substrate, and may include a second light-permeable substrate 1121, a second electrode E2 and a second alignment film 1122.

The first light-permeable substrate 1111 is disposed opposite the second light-permeable substrate 1121. Each of the first electrodes E1 (i.e., the pixel electrode) may be disposed in correspondence with each of the sub-pixels P, and is located on the surface of the first light-permeable substrate 1111 facing the second light-permeable substrate 1121. The first alignment film 1112 is disposed on the first electrode E1. The second electrode E2 (i.e., the common electrode) may be a whole-surface electrode, and is disposed on the surface of the second light-permeable substrate 1121 facing the first light-permeable substrate 1111, and the second alignment film 1122 is disposed on the second electrode E2.

The protrusion 12 is disposed on the first electrode E1 or the second electrode E2. In this embodiment, there are several protrusions 12, and the protrusions 12 are disposed on the first electrode E1 and the second electrode E2, respectively. The protrusion 12 functions as a local restriction mechanism, and can be used to restrict the arrangement directions of liquid crystal molecules 1131 of the liquid crystal layer 113 corresponding to the sub-pixel, so that long axes of the liquid crystal molecules 1131 become substantial vertical when no externally applied voltage is present, the long axes of the liquid crystal molecules 1131 become substantial parallel when a predetermined voltage is externally applied, and the long axes of the liquid crystal molecules 1131 become tilted when a voltage lower than the predetermined voltage is externally applied. In addition, when the voltage lower than the predetermined voltage is applied, the directions of the long axes of most of the liquid crystal molecules 1131 are inclined in each of the pixels P.

The protrusion 12 are disposed on the first electrode E1 and the second electrode E2, respectively, so that the first alignment film 1112 can cover the first electrode E1 and the protrusion 12, and the second alignment film 1122 can cover the second electrode E2 and the protrusion 12. In the top-view condition, the protrusions 12 may be, for example, serrate and disposed on the first electrode E1 and the second electrode E2, to function as a local restriction mechanism, so that the long axes of the liquid crystal molecules 1131 corresponding to each of the sub-pixels P may be in multiple directions when no voltage is applied to achieve the objective of the multi-domain alignment. In addition, the liquid crystal molecules 1131 of the liquid crystal layer 113 are slightly perpendicular to the surfaces of the first electrode E1 and the second electrode E2 through the first alignment film 1112 and the second alignment film 1122 when no externally applied voltage is present. However, because the grinding treatment is not performed on the first alignment film 1112 and the second alignment film 1122, the liquid crystal molecules 1131 existing in the transverse inclined surface of the protrusion 12 have a tendency to be oriented vertically to the inclined surface. Thus, some of the liquid crystal molecules 1131 are tilted by an angle. In the partially tilted liquid crystal molecules 1131 of the protrusion 12, the tilt orientations of the long axes of the liquid crystal molecules 1131 may be determined when a drive voltage is applied between the first electrode E1 and the second electrode E2. Thus, when the drive voltage is applied, the tilt directions of the liquid crystal molecules 1131 in each pixel P have multiple different directions, so that a uniform display can be obtained no matter which direction the display panel 11 is viewed from.

In addition, the display panel 11 may further include a first polarizer 114 and a second polarizer 115, the first polarizer 114 is disposed on a surface of the first substrate 111 away from the liquid crystal layer 113, and the second polarizer 115 is disposed on a surface of the second substrate 112 away from the liquid crystal layer 113. Herein, the first polarizer 114 and the second polarizer 115 having two absorbing axes substantially different from each other by 90 degrees are used, and the intensity of the electric field is controlled to make the liquid crystal molecules be deflected to modulate the polarization property of the light, so that the objective of displaying the image is achieved.

Figure 3A:
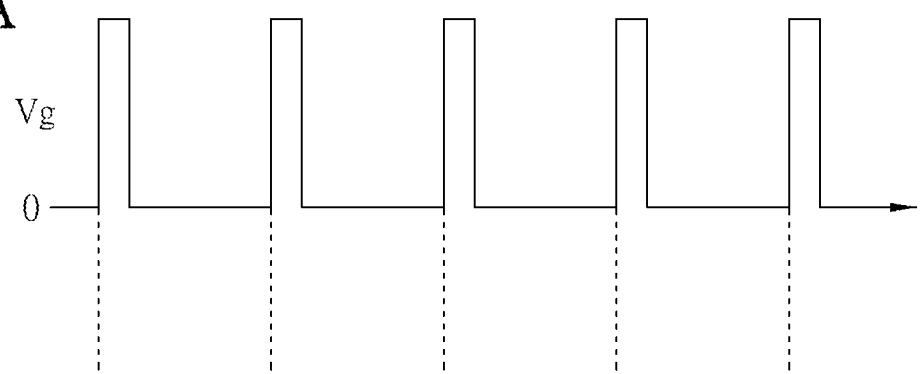
FIGS. 3A to 3D are schematic views showing waveforms of drive voltages of the liquid crystal display device, respectively.

FIGS. 3A to 3D are schematic views showing waveforms of drive voltages of the liquid crystal display device, respectively. FIG. 3A is a schematic view showing a waveform a voltage Vg applied to the gate G of the switch element (TFT) of FIG. 2A, and FIGS. 3B to 3D are schematic views showing waveforms of a voltage Vs applied to the source S of the switch element (TFT) of FIG. 2A, respectively.

When the voltage Vg is applied to the TFT of the sub-pixel P to turn on, the voltage Vs may become the voltage for driving the liquid crystal molecules of each of the pixels P. For example, in FIG. 2A, the voltage Vg is applied to the scan line Si, and the switch element 2 is turned on. Thus, the voltage Vs can be applied to the first electrode E1 of the sub-pixel P to become the voltage for driving the corresponding liquid crystal molecules of the sub-pixel P.

Figure 3B:
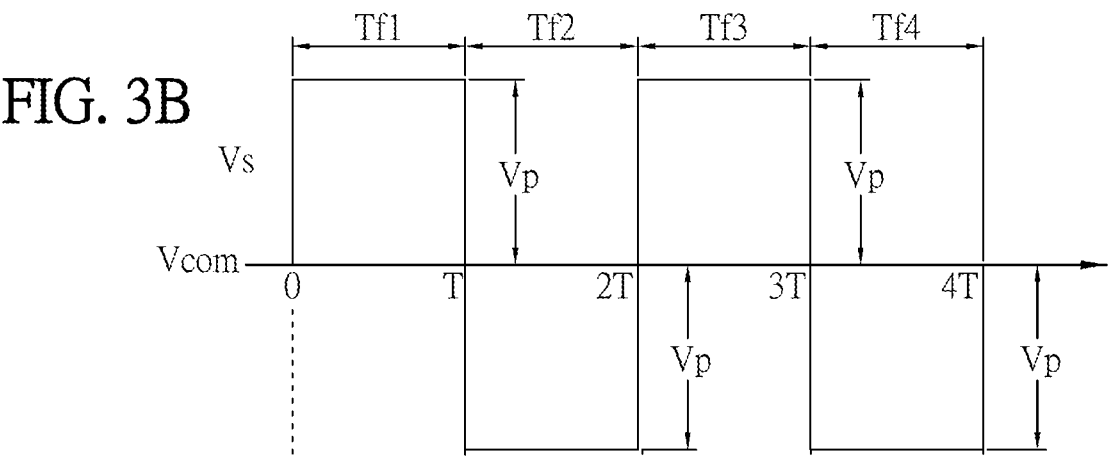
Figure 3C:
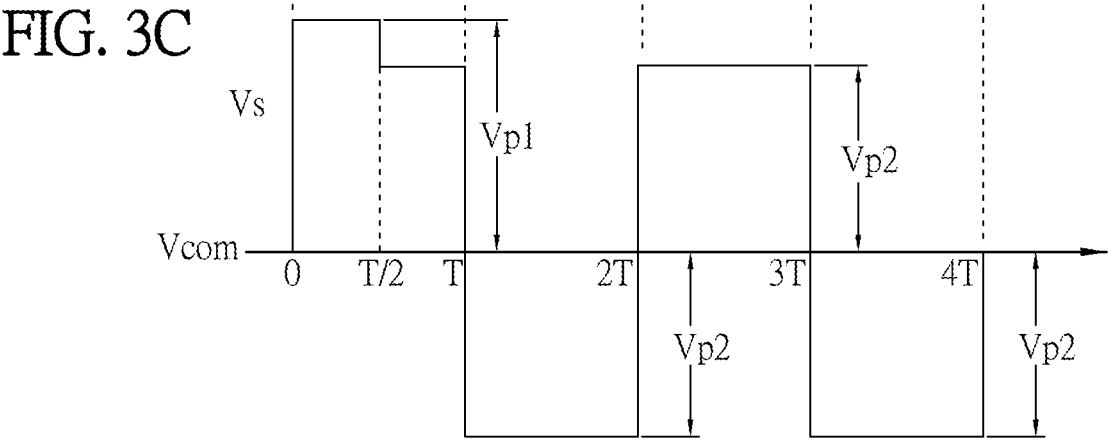
Figure 3D:
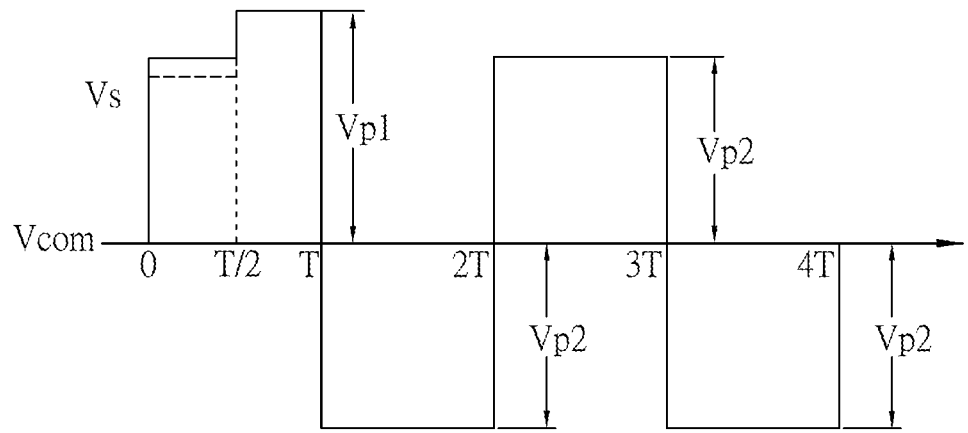

In addition, the voltage Vs shown in FIGS. 3B, 3C and 3D is based on the potential (Vcom) of the second electrode E2, and is reversed once (i.e., the polarity reversal) according to every frame period. That is, the display panel 11 is driven in an alternating manner to prevent the liquid crystal molecules from deteriorating.

In order to make the driving voltage corresponding to a certain transmittance (or transmittance coefficient) change the orientations of the liquid crystal molecules, a driving voltage equal to the target driving voltage (Vp) is generally applied during the entire frame period (the target drive voltage corresponds to the transmittance). Thus, the drive voltage waveform of FIG. 3B is the driving voltage waveform of the well-known technology. In FIG. 3B, the sub-pixel P is applied with the drive voltage in the frame period Tf1 starting from the time 0 and the frame period Tf3 starting from the time 2T. In addition, the sub-pixel P is applied with the reversed drive voltage in the frame period Tf2 starting from the time T and the frame period Tf4 starting from the time 3T. In some embodiments, a frame period is, for example, 16.7 microseconds (ms).

In addition, FIG. 3C is a schematic view showing the waveform of the driving voltage of an embodiment of this disclosure, and can be used to improve the response speed of the liquid crystal molecules. In FIG. 3C, the driving voltage (Vp1) higher than the target driving voltage (Vp2) is applied in the front half period of the first frame period (Tf1), the driving voltage equal to the target driving voltage (Vp2) is applied in the rear half period of the first frame period (Tf1), and the driving voltage equal to the target driving voltage (Vp2) is applied in other frame periods after the first frame period (Tf1).

In addition, FIG. 3D is a schematic view showing the waveform of the driving voltage of another embodiment of this disclosure, and can be used to improve the response speed of the liquid crystal molecules. In FIG. 3D, the driving voltage equal to or lower than the target driving voltage (Vp2) is applied in the front half period of the first frame period (Tf1), the driving voltage (Vp1) higher than the target driving voltage (Vp2) is applied in the rear half period of the first frame period (Tf1), and the driving voltage equal to the target drive voltage (Vp2) is applied in other frame periods after the first frame period (Tf1).

According to the embodiment of this disclosure, with the change of the transmittance of the liquid crystal molecules of the sub-pixel P, the above-mentioned driving voltage waveforms of FIG. 3C or FIG. 3D and FIG. 3B can be flexibly applied. Specifically speaking, the most suitable drive voltage ratio (Vp1/Vp2) may be found according to the target transmittance of the display panel 11, so that the response speed of the liquid crystal molecules is faster, and the brightness over-shoot phenomenon can be prevented.

Figure 4A:
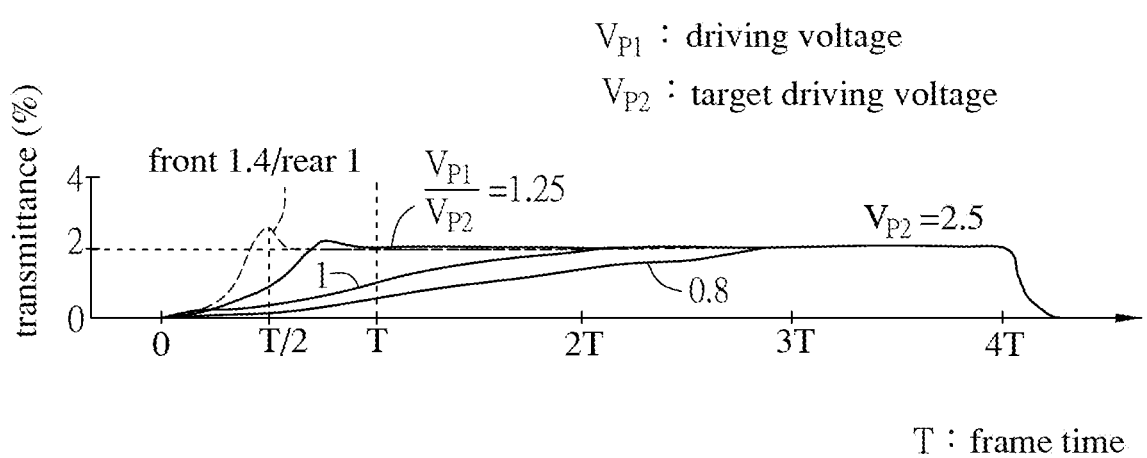
FIGS. 4A to 4D are schematic views showing response properties of the transmittance and the liquid crystal molecules of the liquid crystal display panel of an embodiment of this disclosure, respectively.
Figure 4B:
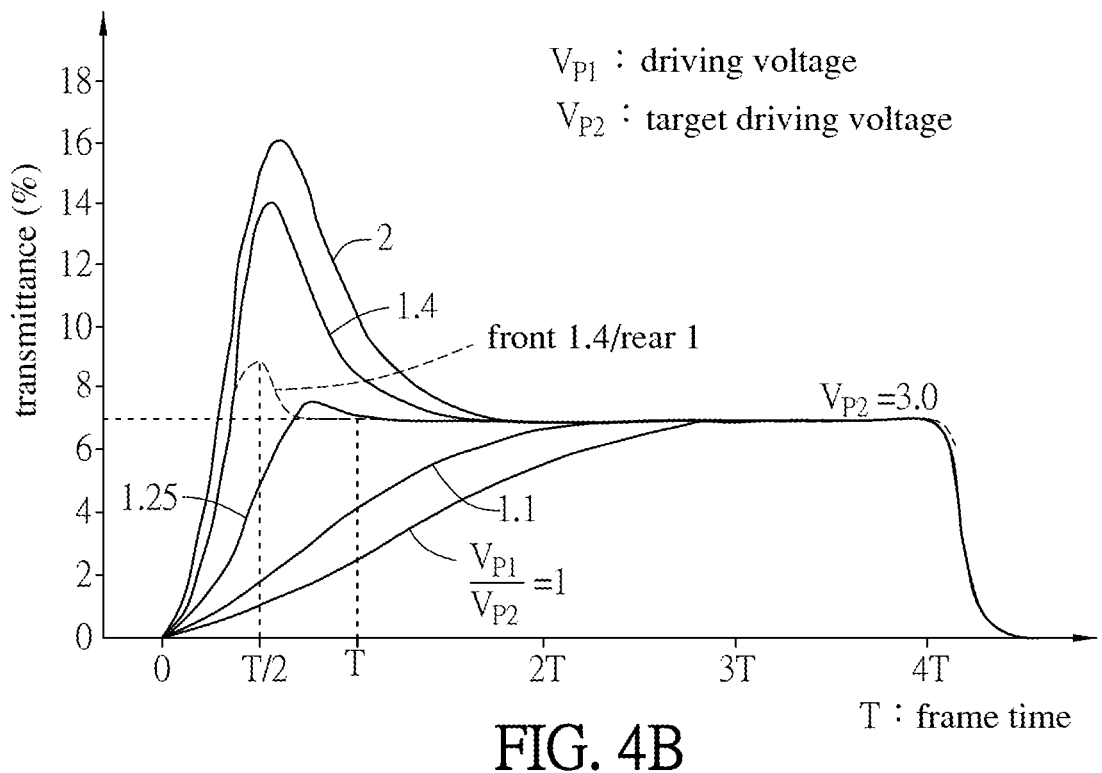
Figure 4C:
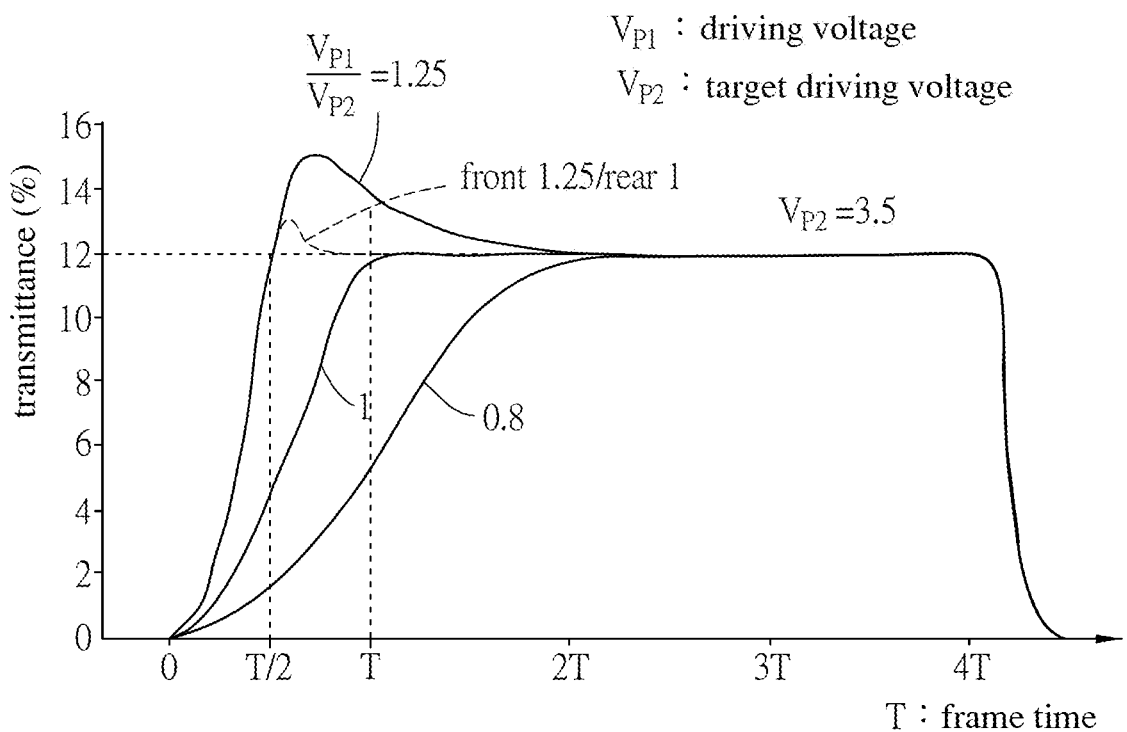
Figure 4D:
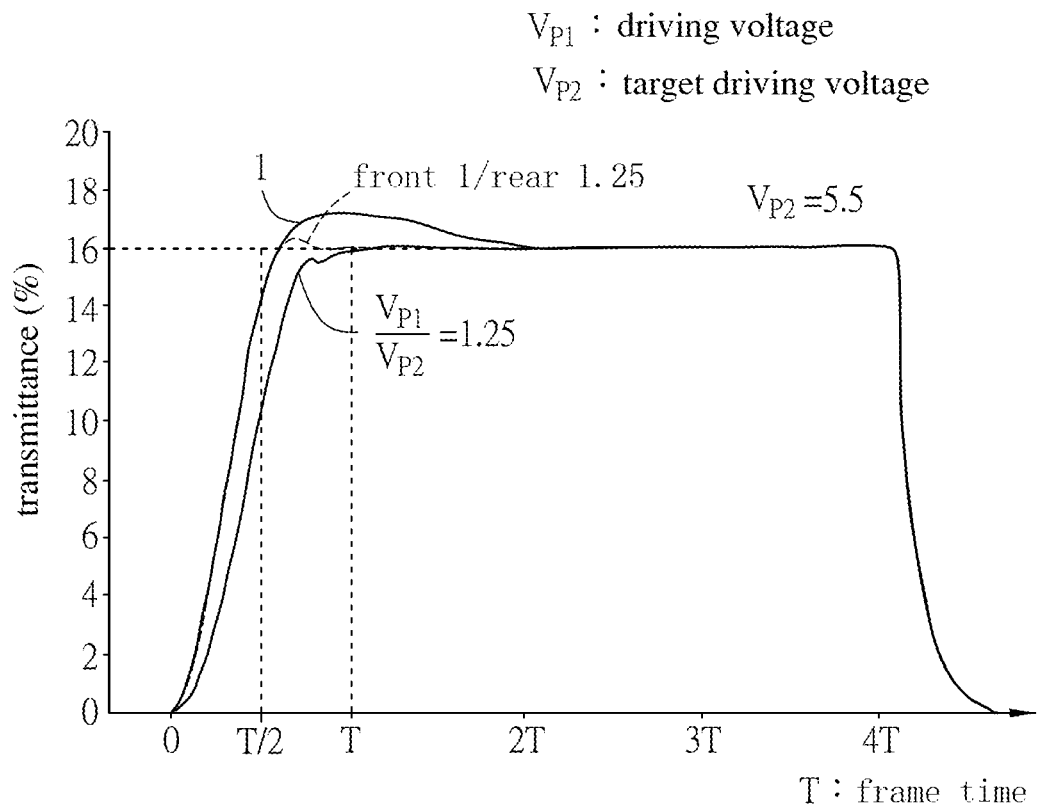

FIGS. 4A to 4D are schematic views showing response properties of the transmittance and the liquid crystal molecules of the liquid crystal display panel 11 of an embodiment of this disclosure, respectively. FIGS. 4A to 4C are the driving methods respectively applied to FIG. 3C, and FIG. 4D is the driving method applied to FIG. 3D.

In FIG. 4A, when the transmittance (transmittance value) is from 0% to about 2%, the target drive voltage Vp2 corresponding to the transmittance of 2% is, for example, 2.5 V. In addition, FIG. 4A further shows the following response properties: the drive voltage Vp1 is equal to 0.8 times of the target driving voltage Vp2 of the transmittance of 2% (Vp1/Vp2=0.8), the drive voltage Vp1 is equal to the target driving voltage Vp2 of the transmittance of 2% (Vp1/Vp2=1), and the drive voltage Vp1 is equal to 1.25 times of the target driving voltage Vp2 of the transmittance 2% (Vp1/Vp2=1.25); and the drive voltage Vp1 of this disclosure in the front half period of the first frame period (0 to T/2) is equal to 1.4 times of the target driving voltage Vp2 of the transmittance of 2% (Vp1/Vp2=1.4), and the drive voltage Vp1 in the rear half period of the first frame period (T/2 to T) is equal to the target driving voltage Vp2 of the transmittance 2% (Vp1/Vp2=1) (as shown by the dashed line). Herein, the front half period of the first frame period is, for example, T/2, the rear half period of the first frame period is also T/2, but they are not restricted thereto. In different embodiments, the front half period may also be, for example, T/3, the rear half period may also be 2T/3 or other combinations, and they are not restricted in this disclosure. In addition, the drive voltage ratio (Vp1/Vp2) of the front half period of the above-mentioned first frame period equal to 1.4 is only provided as an example. In different embodiments, the drive voltage ratio may also be, for example, 1.5, 1.6, 2, . . . , but is not restricted in this disclosure.

In FIG. 4B, when the transmittance is from 0% to about 8%, the target drive voltage Vp2 corresponding to the transmittance of 8% is, for example, 3 V. In addition, FIG. 4B further shows the response properties: the drive voltage Vp1 is equal to the target driving voltage Vp2 of the transmittance of 8% (Vp1/Vp2=1), the drive voltage Vp1 is equal to 1.1 times of the target driving voltage Vp2 of the transmittance of 8% (Vp1/Vp2=1.1), the drive voltage Vp1 is equal to 1.25 times of the target driving voltage Vp2 of the transmittance of 8% (Vp1/Vp2=1.25), the drive voltage Vp1 is equal to 1.4 times of the target driving voltage Vp2 of the transmittance of 8% (Vp1/Vp2=1.4), and the drive voltage Vp1 is equal to 2 times of the target driving voltage Vp2 of the transmittance of 8% (Vp1/Vp2=2); and the drive voltage Vp1 in the front half period of the first frame period (0 to T/2) is equal to 1.4 times of the target driving voltage Vp2 of the transmittance of 8% (Vp1/Vp2=1.4), and the drive voltage Vp1 in the rear half period of the first frame period (T/2 to T) is equal to the target driving voltage Vp2 of the transmittance of 8% (Vp1/Vp2=1) (as shown by the dashed line).

As can be seen from FIGS. 4A and 4B, when the response property is such that the black display with a transmittance of 0% is converted into a low brightness halftone display with a transmittance of about 10% or less, if the drive voltage ratio (Vp1/Vp2) is equal to, for example, 1.4 in the front half period of the (first) frame period at the beginning of time, and is equal to 1 in the rear half period of the (first) frame period at the beginning of time, then as compared with the other driving methods, the response time of the liquid crystal is shorter, the time of the over-shoot phenomenon is very short, and the impact on the display frame is small.

As previously mentioned, the grinding treatment is not performed on the alignment film in the MVA type liquid crystal display panel. Thus, when the first transmittance changes from zero to the second transmittance, and when the target driving voltage Vp2 corresponding to the second transmittance is a low voltage of about 2 to 3 V, it will be time consuming to rotate the liquid crystal molecules to predetermined directions. Thus, as long as the driving voltage of the front half period of the starting first frame period is configured to be equal to, for example, 1.4 times of the target drive voltage, and the driving voltage of the rear half period of the first frame period is configured to be equal to the target drive voltage, then the most suitable rotation torque may be provided to the liquid crystal molecules. In addition to increasing the response speed of the liquid crystal, the time of the brightness over-shoot phenomenon is also very short, and the impact on the display frame is ignorable.

Thus, when the black display with a transmittance of 0% is converted into a low brightness halftone display with a transmittance of about 10% or less, the drive waveform of FIG. 3C is ideal. In addition, the target transmittance can be reached during the first frame period according to the drive waveform.

In FIG. 4C, when the transmittance is from 0% to, for example, about 12%, the target driving voltage Vp2 corresponding to the transmittance 12% is, for example, 3.5 V. In addition, FIG. 4C further shows the response properties: the driving voltage Vp1 is equal to 0.8 times of the target driving voltage Vp2 of the transmittance 12% (Vp1/Vp2=0.8), the driving voltage Vp1 is equal to the target driving voltage Vp2 of the transmittance 12% (Vp1/Vp2=1), and the driving voltage Vp1 is equal to 1.25 times of the target driving voltage Vp2 of the transmittance 12% (Vp1/Vp2=1.25); and the driving voltage Vp1 of this disclosure in the front half period of the first frame period is equal to 1.25 times of the target driving voltage Vp2 of the transmittance 12% (Vp1/Vp2=1.25), and the driving voltage Vp1 in the rear half period of the first frame period is equal to the target driving voltage Vp2 of the transmittance 12% (Vp1/Vp2=1)(as shown by the dashed line). In addition, the drive voltage ratio (Vp1/Vp2) of the front half period of the above-mentioned first frame period equal to 1.25 is only an example. In different embodiments, the drive voltage ratio (Vp1/Vp2) may also be, for example, 1.2, 1.4, 1.5, 1.6, . . . , and this is also not restricted in this disclosure.

As can be seen from FIG. 4C, when the response property is such that the black display with a transmittance of about 0% is converted into a high brightness halftone display with a transmittance of about 10 to 15%, if the drive voltage ratio (Vp1/Vp2) is equal to 1.25 in the front half period of the (first) frame period at the beginning of time, and is equal to 1 in the rear half period of the (first) frame period at the beginning of time, then the response time of the liquid crystal is the shortest, the time of the brightness over-shoot phenomenon is also very short, and the impact on the display frame is small. The reason is that when the target driving voltage Vp2 is about 3 V or more, the torque for rotating the liquid crystal molecules becomes larger. If the drive voltage ratio is increased according to this reason, the reason of becoming the over-shoot is present. Thus, if the drive voltage ratio (Vp1/Vp2) in the front half period of the first frame period is equal to 1.25, and the rear half period of the first frame period is equal to 1, then as compared with other driving methods, the response time of the liquid crystal is very short, and the brightness over-shoot phenomenon is not obvious.

In addition, in FIG. 4D, when the transmittance is from 0% to, for example, about 16%, the target driving voltage Vp2 corresponding to the transmittance of 16% is, for example, 5.5 V. In addition, FIG. 4D further shows the response properties: the driving voltage Vp1 is equal to the target driving voltage Vp2 of the transmittance of 16% (Vp1/Vp2=1), and the driving voltage Vp1 is equal to 1.25 times of the target driving voltage Vp2 of the transmittance of 16% (Vp1/Vp2=1.25); and the driving voltage Vp1 of this disclosure in the front half period of the first frame period is equal to the target driving voltage Vp2 of the transmittance of 16% (Vp1/Vp2=1), and the driving voltage Vp1 in the rear half period of the first frame period is equal to 1.25 times of the target driving voltage Vp2 of the transmittance of 16% (Vp1/Vp2=1.25) (as shown by the dashed line). In addition, the drive voltage ratio (Vp1/Vp2) of the front half period of the above-mentioned first frame period equal to 1 is only an example. In different embodiments, the drive voltage ratio (Vp1/Vp2) of the front half period of the first frame period may also smaller than 1, such as 0.8 or 0.7. In addition, the drive voltage ratio corresponding to the above-mentioned driving voltage Vp1 in the rear half period of the first frame period may also be equal to, for example, 1.3, 1.4, . . . , and this is also not restricted in this disclosure.

As can be seen from FIG. 4D, when the response property is such that the black display with a transmittance of about 0% is converted into a white display with a transmittance of about 15%, if the drive voltage ratio (Vp1/Vp2) is equal to 1.0 or 0.8 in the front half period of the (first) frame period at the beginning of time, and is equal to 1.25 in the rear half period of the (first) frame period at the beginning of time, then as compared with other driving methods, the response time of the liquid crystal is the shortest, the time of the brightness over-shoot phenomenon is also very short, and the impact on the display frame is small. The reason is that when the drive voltage Vp1 becomes about 5 V or more than 5 V, the local restriction mechanism (i.e., the liquid crystal molecules corresponding to the protrusion 12) starts to be oriented.

It can be obtained that if the black display is converted into a white display with a transmittance of about 15% or more, and if the drive voltage ratio (Vp1/Vp2) is equal to 1.25 during the entire frame period, then the response time of the liquid crystal is not short enough although the over-shoot disappears. At this time, if the drive voltage ratio is equal to 0.8 or 1, then it also produces a large over-shoot to make the frame flicker although its response speed is faster. The reason is that when the drive voltage Vp1 is equal to about 5 V, a portion of the liquid crystal molecules corresponding to the local restriction mechanism (the protrusion 12) starts to be oriented. That is, the drive voltage Vp1 can be divided in the area of the protrusion 12. The liquid crystal molecules corresponding to the area of the protrusion 12 can be applied with a voltage lower than the drive voltage Vp1 (lower than 5 V), and the voltage of the liquid crystal molecules corresponding to the area of the protrusion 12 is below the orientation threshold value of the liquid crystal molecules, so the liquid crystal molecules are not rotated. Thus, when the drive voltage ratio is equal to 0.8 or 1, the operation of the liquid crystal molecules outside the area corresponding to the protrusion 12 can dominate the entire display frame, so that the brightness has the over-shoot phenomenon with the increase of the response speed.

On the other hand, if the drive voltage Vp1 is higher than 5 V or more, then the voltage of the area corresponding to the protrusion 12 is higher than the orientation threshold values of the liquid crystal molecules to promote the liquid crystal molecules to start rotating. However, because the orientation direction of the liquid crystal molecules will not become stable immediately, the overall response speed is decreased. Thus, during the (first) frame period at the beginning of the entire time and when Vp1/Vp2=1.25, the operations of the liquid crystal molecules of the area corresponding to the protrusion 12 start in first frame period, and the over-shoot can be reduced as they move slowly.

However, even so, it is found that, when the 1.25 times of the target drive voltage is used in the (first) frame period at the beginning of the entire time, the response speed of the liquid crystal molecules is still not fast enough. Thus, if the drive voltage ratio (Vp1/Vp2) is equal to 1.0 or 0.8 in the front half period of the (first) frame period at the beginning of time, and is equal to 1.25 in the rear half period of the (first) frame period at the beginning of time, not only the response time of the liquid crystal molecules is shorter (shorter than that when the entire frame period corresponding to the drive voltage ratio equal to 1.25), but also the phenomenon of the brightness over-shoot is not obvious (as shown by the dashed line of FIG. 4D).

Figure 5A:
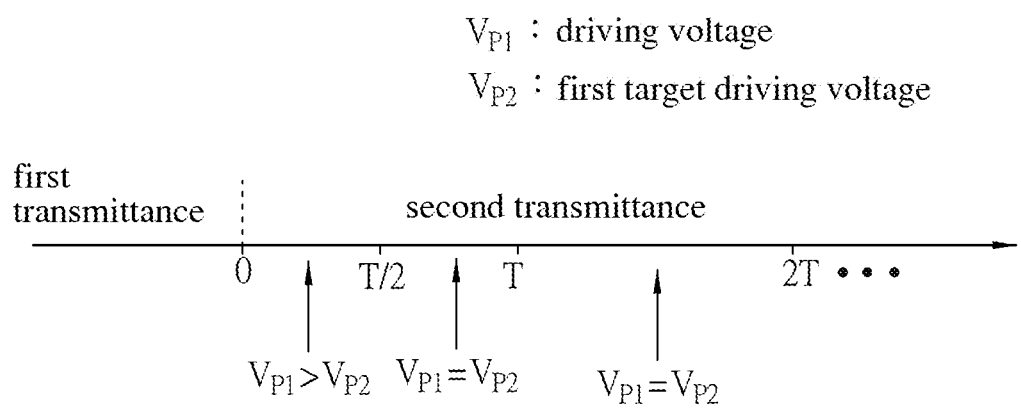
FIGS. 5A to 5C are schematic views showing driving of the liquid crystal display device of this disclosure, respectively.
Figure 5B:
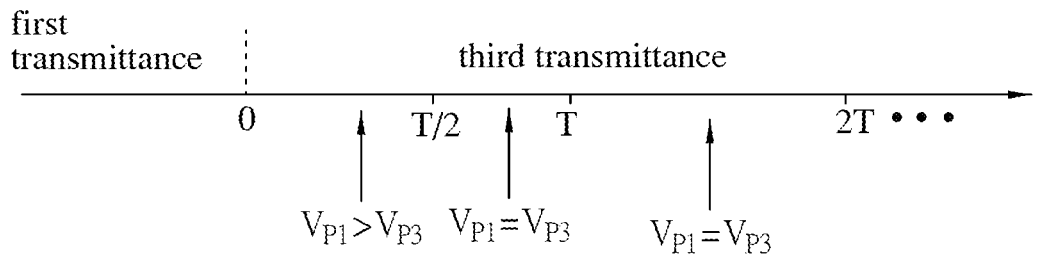
Figure 5C:
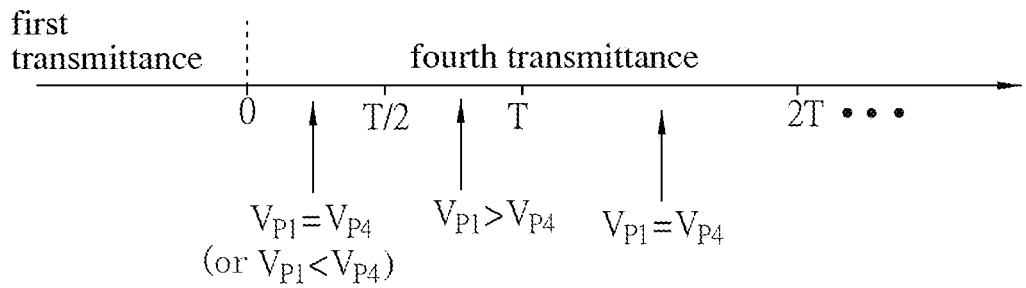

FIGS. 5A to 5C are schematic views showing driving of the liquid crystal display device 1 of this disclosure, respectively.

Referring to FIGS. 5A to 5C, the liquid crystal display device 1 and the driving method thereof can be generalized as follows.

As shown in FIG. 5A, when a transmittance of the display panel 11 is changed from a first transmittance (first transmittance value) to a second transmittance (second transmittance value) higher than the first transmittance in a first frame period, a driving voltage Vp1 applied between a first electrode E1 and a second electrode E2 corresponding to the sub-pixel P is higher than a first target driving voltage Vp2 corresponding to the second transmittance in a front half period of the first frame period, the driving voltage Vp1 applied between the first electrode E1 and the second electrode E2 corresponding to the sub-pixel P is equal to the first target driving voltage Vp2 in a rear half period of the first frame period, and the driving voltage Vp1 applied between the first electrode E1 and the second electrode E2 corresponding to the sub-pixel P is equal to the first target driving voltage Vp2 in other frame periods after the first frame period, so that the response time of the liquid crystal molecule is very short, and the brightness over-shoot phenomenon is not obvious.

In addition, as shown in FIG. 5B, when a transmittance of the sub-pixel P is changed from the first transmittance (first transmittance value) to a third transmittance (second transmittance value) higher than the second transmittance in a second frame period, the driving voltage Vp1 applied between the first electrode E1 and the second electrode E2 corresponding to the sub-pixel P is higher than a second target driving voltage Vp3 corresponding to the third transmittance in a front half period of the second frame period (in order to differentiate from the above-mentioned first frame period, a "second" frame period is named here, but the second frame period is the "first" frame period at the beginning of the procedure of changing the transmittance), the drive voltage Vp1 applied between the first electrode E1 and the second electrode E2 corresponding to the sub-pixel P is equal to the second target drive voltage Vp3 in a rear half period of the second frame period, and the drive voltage Vp1 applied between the first electrode E1 and the second electrode E2 corresponding to the sub-pixel P is equal to the second target drive voltage Vp3 in other frame periods after the second frame period, so that the response time of the liquid crystal molecule is very short, and the brightness over-shoot phenomenon is not obvious.

In addition, as shown in FIG. 5C, when a transmittance of the sub-pixel P is changed from the first transmittance (first transmittance value) to a fourth transmittance (second transmittance value) higher than the third transmittance in a third frame period, the drive voltage Vp1 applied between the first electrode E1 and the second electrode E2 corresponding to the sub-pixel P is lower than or equal to a third target drive voltage Vp4 corresponding to the fourth transmittance in a front half period of the third frame period (in order to differentiate from the above-mentioned first frame period and second frame period, a "third" frame period is named here, but the third frame period is the "first" frame period at the beginning of the procedure of changing the transmittance), the drive voltage Vp1 applied between the first electrode E1 and the second electrode E2 corresponding to the sub-pixel P is equal to the third target drive voltage Vp4 in a rear half period of the third frame period, and the drive voltage Vp1 applied between the first electrode E1 and the second electrode E2 corresponding to the sub-pixel P is equal to the third target drive voltage Vp4 in other frame periods after the third frame period, so that the response time of the liquid crystal molecule is very short, and the brightness over-shoot phenomenon is not obvious.

It is to be particularly described that the above-mentioned first frame period, second frame period and third frame period are not the continuous frame times, and the first, second and third are used only for the differentiating purposes. In other words, the above-mentioned "first frame period" is the "first" frame period that occurs after the first transmittance (first transmittance value) starts to change to the second transmittance (second transmittance value), the "second frame period" is the "first" frame period that occurs after the second transmittance starts to change to the third transmittance, and the "third frame period" is the "first" frame period that occurs after the third transmittance starts to change to the fourth transmittance.

In addition, if the temperature of the liquid crystal display panel rises, then the liquid crystal molecules respond faster than expected, so that the brightness thereof may have the over-shoot phenomenon. Thus, if the above-mentioned higher drive voltage ratio is used to drive, then the transmittance of the display panel will be higher than expected (over-shoot), and the correct brightness cannot be displayed.

Figure 6:
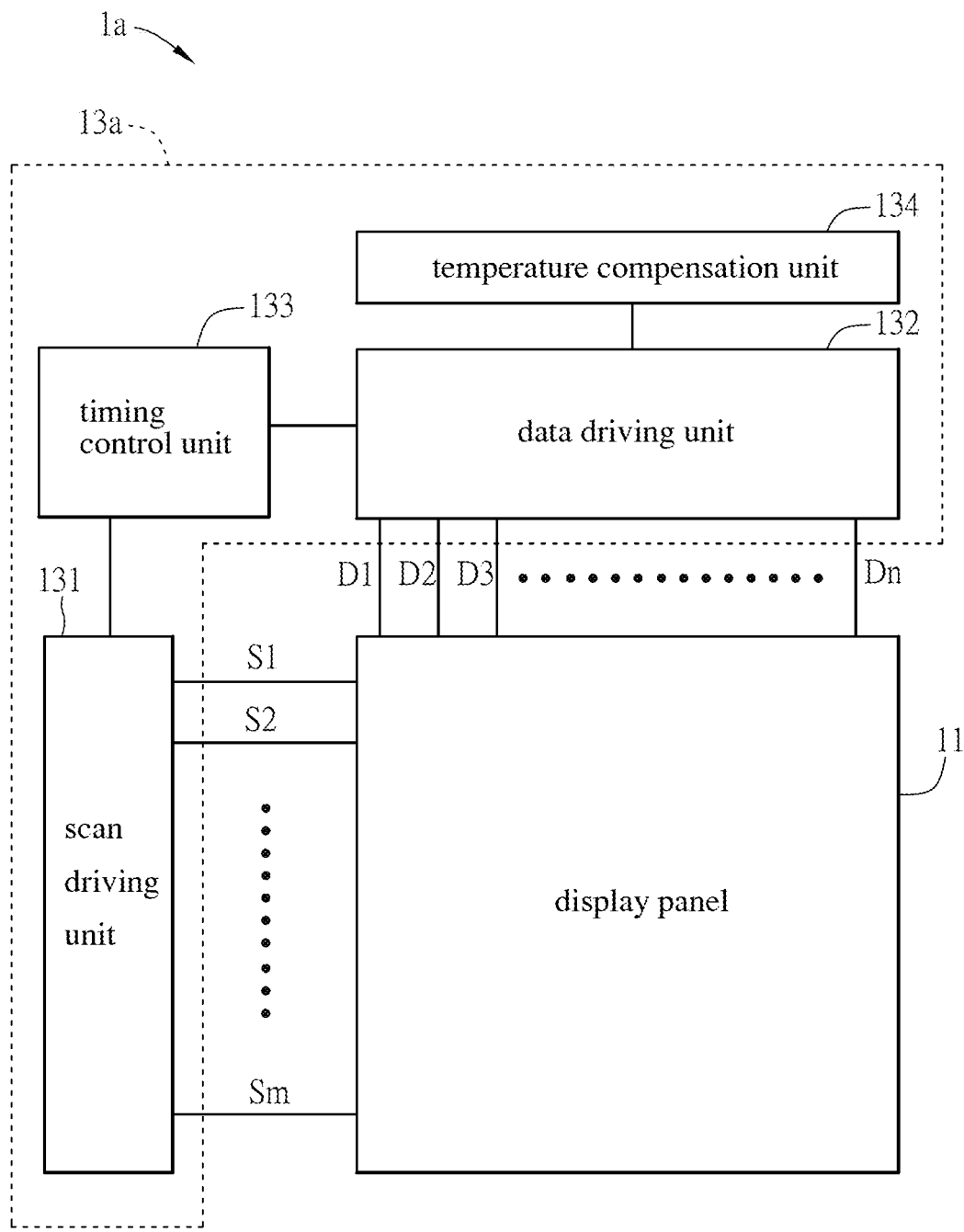
FIG. 6 is a functional schematic block diagram showing the liquid crystal display device of a different embodiment of this disclosure.

FIG. 6 is a functional schematic block diagram showing the liquid crystal display device 1a of a different embodiment of this disclosure.

As shown in FIG. 6, the main difference between a liquid crystal display device 1a of this embodiment and the liquid crystal display device 1 is that a drive circuit 13a further includes a temperature compensation unit 134, and the temperature compensation unit 134 is electrically connected to the data driving unit 132. The temperature compensation unit 134 can decrease the voltage value of the drive voltage Vp1 when the temperature of the display panel 11 rises. In other words, the temperature of the display panel 11 can be detected by a temperature detecting element. When the temperature of the display panel 11 is higher than a predetermined temperature, the temperature compensation unit 134 can decrease the voltage value of the drive voltage in the first frame period, the third transmittance or the fourth transmittance and starting to apply the drive voltage. That is, the ratio of the drive voltage and the target drive voltage is decreased (the drive voltage ratio is decreased) to avoid the too bright phenomenon of the panel. For example, when the temperature rises 1 degree, the voltage value of the drive voltage can be decreased by 1%, or other ratios.

In addition, other technical features of the liquid crystal display device 1a can be found in the above-mentioned liquid crystal display device 1, and detailed descriptions thereof will be omitted.

In summary, in the liquid crystal display device and the driving method thereof of this disclosure, when a transmittance of the sub-pixel is changed from one transmittance value to another transmittance value higher than the first transmittance value in a first frame period, the drive voltage applied between the first electrode and the second electrode corresponding to the sub-pixel is lower than or equal to the target drive voltage corresponding to the another transmittance value in a front half period of the first frame period, the drive voltage applied between the first electrode and the second electrode corresponding to the sub-pixel is higher than the target drive voltage in the rear half period of the first frame period, and the drive voltage applied between the first electrode and the second electrode corresponding to the sub-pixel is equal to the target drive voltage in other frame periods after the first frame period. With the above-mentioned driving method, the n-type MVA liquid crystal display device of this disclosure can shorten the response time of the liquid crystal, during which the black display is converted into the white display, the time of the brightness over-shoot phenomenon is very short, and no adverse impact on the display frame is present.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A liquid crystal display device, comprising:
   a display panel including a plurality of sub-pixels and a first substrate, a second substrate and a liquid crystal layer interposed between the first substrate and the second substrate, wherein the first substrate comprises a first electrode, and the second substrate comprises a second electrode;
   at least one protrusion disposed on the first electrode or the second electrode; and
   a drive circuit electrically connected to the display panel and outputting a drive voltage applied between the first electrode and the second electrode corresponding to one of the sub-pixels;

wherein, when a transmittance of the sub-pixel is changed from 0% to at least 15% in a first frame period, a voltage ratio of the drive voltage applied between the first electrode and the second electrode corresponding to the sub-pixel to a target drive voltage corresponding to the transmittance of at least 15% in a front half period of the first frame period is within a range from 0.8 to 1.0, the voltage ratio of the drive voltage applied between the first electrode and the second electrode corresponding to the sub-pixel to the target drive voltage in a rear half period of the first frame period is at least 1.25, and the drive voltage applied between the first electrode and the second electrode corresponding to the sub-pixel is equal to the target drive voltage in other frame periods after the first frame period.

2. The liquid crystal display device according to claim 1, wherein the drive circuit comprises a temperature compensation unit, and the temperature compensation unit decreases a voltage value of the drive voltage in the first frame period when a temperature of the display panel rises.

3. The liquid crystal display device according to claim 1, wherein the display panel further comprises a first polarizer and a second polarizer, the first polarizer is disposed on a surface of the first substrate away from the liquid crystal layer, and the second polarizer is disposed on a surface of the second substrate away from the liquid crystal layer.

4. The liquid crystal display device according to claim 1, wherein the first substrate further comprises a first alignment film and a second alignment film, the first alignment film is disposed on the first electrode and the protrusion, and the second alignment film is disposed on the second electrode and the protrusion.

5. The liquid crystal display device according to claim 4, wherein a plurality of liquid crystal molecules of the liquid crystal layer are substantially perpendicular to surfaces of the first electrode and the second electrode through the first alignment film and the second alignment film when no externally applied voltage is present.

6. The liquid crystal display device according to claim 1, wherein the protrusion functions as a local restriction mechanism to restrict arrangement directions of a plurality of liquid crystal molecules corresponding to the sub-pixel to make long axes of the liquid crystal molecules become substantial vertical when no externally applied voltage is present, to make the long axes of the liquid crystal molecules become substantial parallel when a predetermined voltage is externally applied, and make directions of the long axes of most of the liquid crystal molecules become tilted when a voltage lower than the predetermined voltage is externally applied.

7. The liquid crystal display device according to claim 1, wherein a polarity of the drive voltage reverses once according to every frame period.

8. The liquid crystal display device according to claim 1, wherein the first electrode is a pixel electrode of the sub-pixel, and the second electrode is a common electrode.

9. The liquid crystal display device according to claim 1, further comprising:
a plurality of scan lines and a plurality of data lines, wherein the display panel includes a plurality of sub-pixels, and the data lines and the scan lines are interleaved to define the sub-pixels.

10. The liquid crystal display device according to claim 1, wherein the liquid crystal layer includes a plurality of liquid crystal molecules with negative dielectric anisotropy.

11. A driving method of a liquid crystal display device, wherein the liquid crystal display device comprises a display panel, at least one protrusion and a drive circuit, the display panel includes a plurality of sub-pixels and a first substrate, a second substrate and a liquid crystal layer interposed between the first substrate and the second substrate, the first substrate comprises a first electrode, the second substrate comprises a second electrode, the protrusion is disposed on the first electrode or the second electrode, the drive circuit is electrically connected to the display panel and outputs a drive voltage applied between the first electrode and the second electrode corresponding to one of the sub-pixels, and the driving method comprises:
when a transmittance of the sub-pixel is changed from 0% to at least 15% in a first frame period, applying the drive voltage applied between the first electrode and the second electrode corresponding to the sub-pixel, wherein a voltage ratio of the drive voltage to a target drive voltage corresponding to the transmittance of at least 15% in a front half period of the first frame period is within a range from 0.8 to 1.0, the voltage ratio of the drive voltage to the target drive voltage in a rear half period of the first frame period is at least 1.25, and the drive voltage is equal to the target drive voltage in other frame periods after the first frame period.

12. The driving method according to claim 11, wherein the drive circuit comprises a temperature compensation unit, and the driving method further comprises:
decreasing a voltage value of the drive voltage in the first frame period when a temperature of the display panel rises.

13. The driving method according to claim 11, wherein the display panel further comprises a first polarizer and a second polarizer, the first polarizer is disposed on a surface of the first substrate away from the liquid crystal layer, and the second polarizer is disposed on a surface of the second substrate away from the liquid crystal layer.

14. The driving method according to claim 11, wherein the first substrate further comprises a first alignment film and a second alignment film, the first alignment film is disposed on the first electrode and the protrusion, and the second alignment film is disposed on the second electrode and the protrusion.

15. The driving method according to claim 14, wherein a plurality of liquid crystal molecules of the liquid crystal layer are substantially perpendicular to surfaces of the first electrode and the second electrode through the first alignment film and the second alignment film when no externally applied voltage is present.

16. The driving method according to claim 11, wherein the protrusion functions as a local restriction mechanism to restrict arrangement directions of a plurality of liquid crystal molecules corresponding to the sub-pixel to make long axes of the liquid crystal molecules become substantial vertical when no externally applied voltage is present, to make the long axes of the liquid crystal molecules become substantial parallel when a predetermined voltage is externally applied, and make directions of the long axes of most of the liquid crystal molecules become tilted when a voltage lower than the predetermined voltage is externally applied.

17. The driving method according to claim 11, wherein a polarity of the drive voltage reverses once according to every frame period.

18. The driving method according to claim 11, wherein the first electrode is a pixel electrode of the sub-pixel, and the second electrode is a common electrode.

19. The driving method according to claim 11, wherein the liquid crystal layer includes a plurality of liquid crystal molecules with negative dielectric anisotropy.

20. A driving method of a liquid crystal display device, wherein the liquid crystal display device comprises a display panel, at least one protrusion and a drive circuit, the display panel includes a plurality of sub-pixels and a first substrate, a second substrate and a liquid crystal layer interposed between the first substrate and the second substrate, the first substrate comprises a first electrode, the second substrate comprises a second electrode, the protrusion is disposed on the first electrode or the second electrode, the protrusion functions as a local restriction mechanism to restrict arrangement directions of a plurality of liquid crystal molecules corresponding to the sub-pixel to make long axes of the liquid crystal molecules become substantial vertical when no externally applied voltage is present, make the long axes of the liquid crystal molecules become substantial parallel when a predetermined voltage is externally applied, and make directions of the long axes of most of the liquid crystal molecules become tilted when a voltage lower than the predetermined voltage is externally applied, the drive circuit is electrically connected to the display panel and outputs a drive voltage applied between the first electrode and the second electrode corresponding to one of the sub-pixels, and the driving method comprises:

when a transmittance of the sub-pixel is changed from 0% to at least 15% in a first frame period, applying the drive voltage applied between the first electrode and the second electrode corresponding to the sub-pixel, wherein a voltage ratio of the drive voltage to a target drive voltage corresponding to the transmittance of at least 15% in a front half period of the first frame period is within a range from 0.8 to 1.0, the voltage ratio of the drive voltage to the target drive voltage in a rear half period of the first frame period is at least 1.25, and the drive voltage is equal to the target drive voltage in other frame periods after the first frame period;

wherein the drive circuit comprises a temperature compensation unit, and the temperature compensation unit decreases a voltage value of the drive voltage in the first frame period when a temperature of the display panel rises.

* * * * *